United States Patent
Akkarakaran et al.

(10) Patent No.: US 11,483,869 B2
(45) Date of Patent: Oct. 25, 2022

(54) TIMING CONTROL FOR RANDOM ACCESS CHANNEL (RACH)

(71) Applicant: QUALCOMM Incorporated, San Diego, CA (US)

(72) Inventors: Sony Akkarakaran, Poway, CA (US); Xiaoxia Zhang, San Diego, CA (US); Jing Sun, San Diego, CA (US); Muhammad Nazmul Islam, Littleton, MA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/742,552

(22) Filed: Jan. 14, 2020

(65) Prior Publication Data

US 2020/0236715 A1 Jul. 23, 2020

Related U.S. Application Data

(60) Provisional application No. 62/793,817, filed on Jan. 17, 2019.

(51) Int. Cl.
| | | |
|---|---|---|
| *H04W 74/08* | (2009.01) | |
| *H04W 56/00* | (2009.01) | |
| *H04W 72/12* | (2009.01) | |
| *H04W 40/38* | (2009.01) | |

(52) U.S. Cl.
CPC ....... *H04W 74/0833* (2013.01); *H04W 40/38* (2013.01); *H04W 56/001* (2013.01); *H04W 56/005* (2013.01); *H04W 56/0045* (2013.01); *H04W 72/1289* (2013.01); *H04W 74/0891* (2013.01)

(58) Field of Classification Search
None
See application file for complete search history.

(56) References Cited

U.S. PATENT DOCUMENTS

| | | | |
|---|---|---|---|
| 2012/0287800 A1* | 11/2012 | Siomina | H04W 64/003 370/252 |
| 2014/0044108 A1 | 2/2014 | Earnshaw et al. | |
| 2015/0016352 A1 | 1/2015 | Bressanelli et al. | |
| 2015/0181595 A1 | 6/2015 | Li et al. | |
| 2018/0198646 A1* | 7/2018 | Gau | H04L 5/0007 |
| 2020/0146069 A1* | 5/2020 | Chen | H04W 52/362 |

(Continued)

FOREIGN PATENT DOCUMENTS

EP 3157296 A1 4/2017

OTHER PUBLICATIONS

International Search Report and Written Opinion—PCT/US2020/013695—ISAEPO—dated Jun. 29, 2020.

(Continued)

*Primary Examiner* — Jutai Kao
(74) *Attorney, Agent, or Firm* — Harrity & Harrity LLP

(57) ABSTRACT

Various aspects of the present disclosure generally relate to wireless communication. In some aspects, a user equipment (UE) may determine an estimated timing advance (TA) for one or more communications included in a set of communications of a random access channel procedure. The UE may transmit, to a base station, the one or more communications based at least in part on the estimated TA. Numerous other aspects are provided.

30 Claims, 9 Drawing Sheets

(56) References Cited

U.S. PATENT DOCUMENTS

| | | | | |
|---|---|---|---|---|
| 2020/0187264 | A1* | 6/2020 | Charbit | H04W 74/0833 |
| 2021/0068132 | A1* | 3/2021 | Wang | H04W 72/1268 |
| 2021/0168862 | A1* | 6/2021 | Murray | H04W 74/002 |
| 2021/0345424 | A1* | 11/2021 | Cirik | H04W 74/08 |
| 2022/0007433 | A1* | 1/2022 | Liu | H04W 80/02 |
| 2022/0046711 | A1* | 2/2022 | Kronander | H04W 74/0833 |

OTHER PUBLICATIONS

Qualcomm Incorporated: "2 Step and 4 Step RACH", 3GPP Draft, 3GPP TSG-RAN WG1 #87, R1-1612033, 2 Step and 4 Step RACH, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), XP051175994, 3 pages, Retrieved from the Internet: URL: http://www.3gpp.org/ftp/Meetings_3GPP_SYNC/RAN1/Docs/, [retrieved on Nov. 13, 2016], Section 1, Section 2, figures 1.2.

Nokia, et al., "Random Access Principles for New Radio", 3GPP Draft, 3GPP TSG-RAN WG1 #87, R1-1612299_ Random Access Principles for New Radio, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), XP051176248, 4 Pages, Retrieved from the Internet: URL: http://www.3gpp.org/ftp/tsg_ran/WG1_RL1/TSGR1_87/Docs/R1-1612299.zip, [retrieved on Nov. 13, 2016], Section 1, Section 2, figure 1, Section 2.4.

ZTE Corporation, et al., "On 2-Step Random Access Procedure", 3GPP Draft, 3GPP TSG Ran WG1 Meeting #86b, R1-1608969 On 2-Step Random Access Procedure, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051149022, 3 pages, Retrieved from the Internet: URL: http://www.3gpp.org/ftp/Meetings_3GPP_SYNC/RAN1/Docs/, [retrieved on Oct. 9, 2016], Section 2.1 Section 2.2 figure 2.

Interdigital Communications: "2-step Random Access Procedure", 3GPP Draft, R1-1700703, 3rd Generation Partnership Project (3GPP), Mobile Competence Centre, 650, Route Des Lucioles, F-06921 Sophia-Antipolis Cedex, France, vol. RAN WG1, No. Spokane, USA, Jan. 16, 2017-Jan.20, 2017, Jan. 10, 2017 (Jan. 10, 2017), XP051203022, 4 pages, Retrieved from the Internet: URL: http://www.3gpp.org/ftp/tsg_ran/WG1_RL1/TSGR1_AH/NR_AH_1701/Docs/. [retrieved on Jan. 10, 2017] Section 2.

Partial International Search Report—PCT/US2020/013695—ISA/EPO—dated Apr. 21, 2020.

* cited by examiner

TIMING CONTROL FOR RANDOM ACCESS CHANNEL (RACH)

CROSS-REFERENCE TO RELATED APPLICATION

This application claims priority to U.S. Provisional Application No. 62/793,817, filed on Jan. 17, 2019, entitled "TIMING CONTROL FOR RANDOM ACCESS CHANNEL (RACH)," which is hereby expressly incorporated by reference herein.

FIELD OF THE DISCLOSURE

Aspects of the present disclosure generally relate to wireless communication, and to techniques and apparatuses for timing control for random access channel (RACH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method of wireless communication, performed by a user equipment (UE), may include determining an estimated timing advance (TA) for one or more communications included in a set of communications of a random access channel (RACH) procedure. The method may include transmitting, to a base station (BS), the one or more communications based at least in part on the estimated TA.

In some aspects, a UE for wireless communication may include memory and one or more processors operatively coupled to the memory. The memory and the one or more processors may be configured to determine an estimated TA for one or more communications included in a set of communications of a RACH procedure. The memory and the one or more processors may be configured to transmit, to a BS, the one or more communications based at least in part on the estimated TA.

In some aspects, a non-transitory computer-readable medium may store one or more instructions for wireless communication. The one or more instructions, when executed by one or more processors of a UE, may cause the one or more processors to determine an estimated TA for one or more communications included in a set of communications of a RACH procedure. The one or more instructions, when executed by one or more processors of a UE, may cause the one or more processors to transmit, to a BS, the one or more communications based at least in part on the estimated TA.

In some aspects, an apparatus for wireless communication may include means for determining an estimated TA for one or more communications included in a set of communications of a RACH procedure. The apparatus may include means for transmitting, to a BS, the one or more communications based at least in part on the estimated TA.

In some aspects, a method of wireless communication, performed by a UE, may include transmitting, to a BS, a RACH preamble communication associated with a two-step RACH procedure. The method may include receiving, from the BS and prior to receiving a random access response (RAR) communication, a physical downlink control channel (PDCCH) communication, wherein the PDCCH communication includes an indication of a TA for transmitting a RACH communication to the BS. The method may include transmitting, to the BS, the RACH communication based at least in part on the TA.

In some aspects, a UE for wireless communication may include memory and one or more processors operatively coupled to the memory. The memory and the one or more processors may be configured to transmit, to a BS, a RACH preamble communication associated with a two-step RACH procedure. The memory and the one or more processors may be configured to receive, from the BS and prior to receiving an RAR communication, a PDCCH communication, wherein the PDCCH communication includes an indication of a TA for transmitting a RACH communication to the BS. The memory and the one or more processors may be configured to transmit, to the BS, the RACH communication based at least in part on the TA.

In some aspects, a non-transitory computer-readable medium may store one or more instructions for wireless communication. The one or more instructions, when executed by one or more processors of a UE, may cause the one or more processors to transmit, to a BS, a RACH preamble communication associated with a two-step RACH procedure. The one or more instructions, when executed by one or more processors of a UE, may cause the one or more processors to receive, from the BS and prior to receiving an RAR communication, a PDCCH communication, wherein the PDCCH communication includes an indication of a TA for transmitting a RACH communication to the BS. The one or more instructions, when executed by one or more processors of a UE, may cause the one or more processors to transmit, to the BS, the RACH communication based at least in part on the TA.

In some aspects, an apparatus for wireless communication may include means for transmitting, to a BS, a RACH preamble communication associated with a two-step RACH procedure. The apparatus may include means for receiving, from the BS and prior to receiving an RAR communication, a PDCCH communication, wherein the PDCCH communication includes an indication of a TA for transmitting a RACH communication to the BS. The apparatus may include means for transmitting, to the BS, the RACH communication based at least in part on the TA.

In some aspects, a method of wireless communication, performed by a BS, may include determining, based at least in part on a RACH preamble communication received from a UE, an estimated TA for a RACH communication transmitted from the UE. The method may include decoding, prior to transmitting an RAR communication to the UE, the RACH communication based at least in part on the estimated TA.

In some aspects, a BS for wireless communication may include memory and one or more processors operatively coupled to the memory. The memory and the one or more processors may be configured to determine, based at least in part on a RACH preamble communication received from a UE, an estimated TA for a RACH communication transmitted from the UE. The memory and the one or more processors may be configured to decode, prior to transmitting an RAR communication to the UE, the RACH communication based at least in part on the estimated TA.

In some aspects, a non-transitory computer-readable medium may store one or more instructions for wireless communication. The one or more instructions, when executed by one or more processors of a B S, may cause the one or more processors to determine, based at least in part on a RACH preamble communication received from a UE, an estimated TA for a RACH communication transmitted from the UE. The one or more instructions, when executed by one or more processors of a base station, may cause the one or more processors to decode, prior to transmitting an RAR communication to the UE, the RACH communication based at least in part on the estimated TA.

In some aspects, an apparatus for wireless communication may include means for determining, based at least in part on a RACH preamble communication received from a UE, an estimated TA for a RACH communication transmitted from the UE. The apparatus may include means for decoding, prior to transmitting an RAR communication to the UE, the RACH communication based at least in part on the estimated TA.

In some aspects, a method of wireless communication, performed by a BS, may include receiving, from a UE, a RACH preamble communication associated with a RACH procedure. The method may include transmitting, to the UE and prior to transmitting an RAR communication to the UE, a PDCCH communication, wherein the PDCCH communication includes an indication of a TA for transmitting a RACH communication to the BS.

In some aspects, a BS for wireless communication may include memory and one or more processors operatively coupled to the memory. The memory and the one or more processors may be configured to receive, from a UE, a RACH preamble communication associated with a RACH procedure. The memory and the one or more processors may be configured to transmit, to the UE and prior to transmitting an RAR communication to the UE, a PDCCH communication, wherein the PDCCH communication includes an indication of a timing TA for transmitting a msg3 communication to the BS.

In some aspects, a non-transitory computer-readable medium may store one or more instructions for wireless communication. The one or more instructions, when executed by one or more processors of a BS, may cause the one or more processors to receive, from a UE, a RACH preamble communication associated with a RACH procedure. The one or more instructions, when executed by one or more processors of a base station, may cause the one or more processors to transmit, to the UE and prior to transmitting a RAR communication to the UE, a PDCCH communication, wherein the PDCCH communication includes an indication of a TA for transmitting a RACH communication to the BS.

In some aspects, an apparatus for wireless communication may include means for receiving, from a UE, a RACH preamble communication associated with a two-step RACH procedure. The apparatus may include means for transmitting, to the UE and prior to transmitting an RAR communication to the UE, a PDCCH communication, wherein the PDCCH communication includes an indication of a TA for transmitting a RACH communication to the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
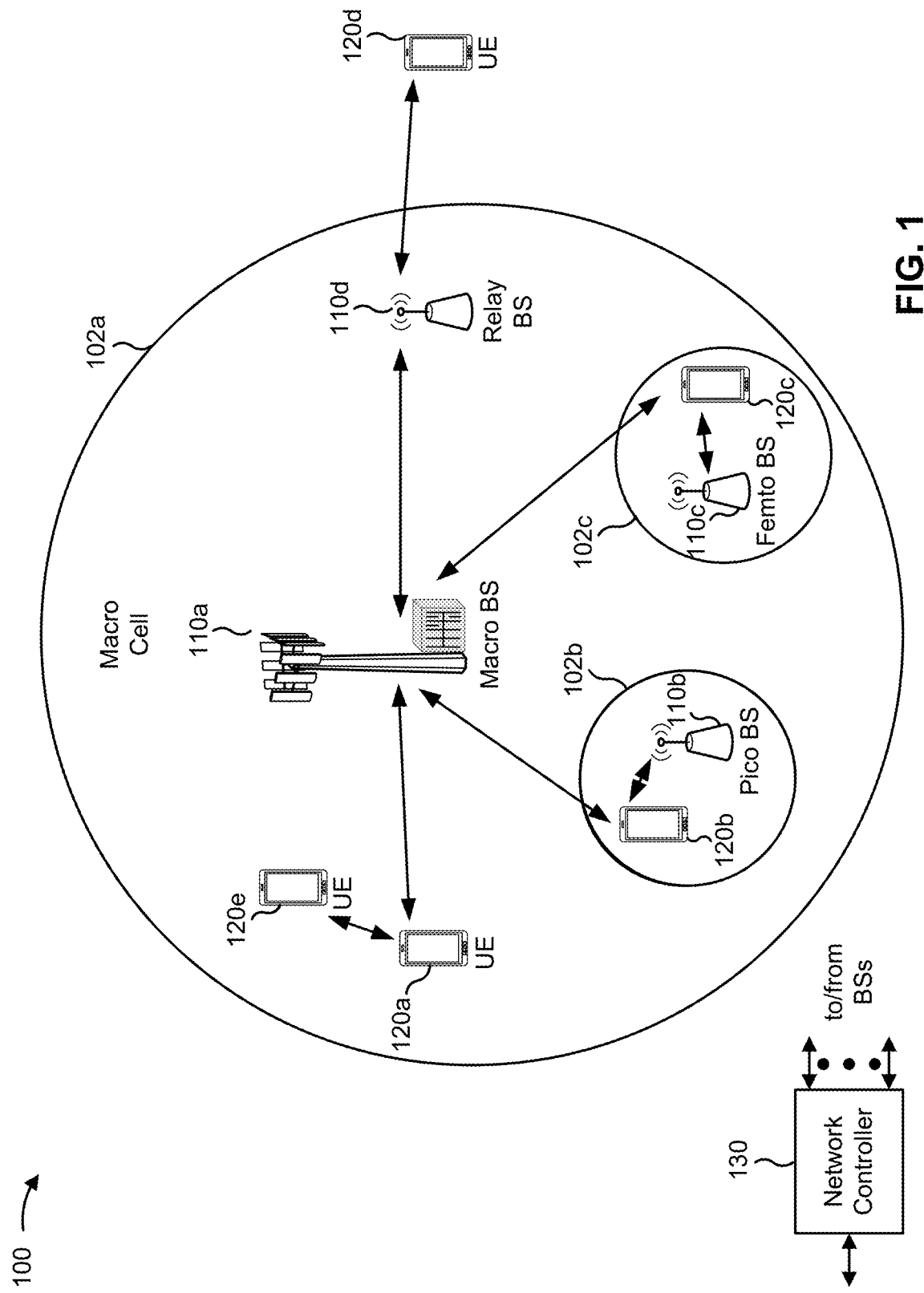
FIG. 1 is a block diagram conceptually illustrating an example of a wireless communication network, in accordance with various aspects of the present disclosure.

A UE may access a wireless network by negotiating a connection with a BS included in the wireless network. During connection establishment, the UE and the BS may synchronize the connection in the downlink direction (i.e., from BS to UE) and in the uplink direction (i.e., from UE to BS).

To synchronize the connection in the downlink direction, the UE may read a synchronization signal block (SSB) that includes various synchronization signals transmitted from the BS. The synchronization signals may include a primary synchronization signal (PSS), a secondary synchronization signal (SSS), and/or the like. The UE may use the PSS to determine symbol timing in the downlink direction, and may use the SSS to determine a physical cell identifier, associated with the BS, and frame timing.

To synchronize the connection in the uplink direction, the UE and the BS may perform a random access (RACH) procedure. In some aspects, the UE and the BS may perform a four-step RACH procedure. In a four-step RACH procedure, the UE and the BS may exchange four primary RACH communications. The UE may transmit a msg1 communication to the BS. The msg1 communication may include a RACH preamble communication. The BS may respond to the msg1 communication with a msg2 communication, which may include a random access response (RAR) communication. The UE may respond to the msg2 communication with a msg3 communication, which may include a radio resource control (RRC) connection request communication. The BS may respond to the msg3 communication with a msg4 communication, which may include a medium access control control element (MAC-CE) contention resolution identifier communication.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a set of communications referred to as a msgA communication. The msg1 communication may be referred to as the preamble of the msgA communication and the msg3 communication may be referred to as the payload of the msgA communication. In this way, the UE transmits the msg1 communication and the msg3 communication sequentially or FDMed with each other and prior to receiving the msg2 communication and the msg4 communication. The BS may receive the msgA communication and may transmit a msgB communication, which may include the msg2 communication and the msg4 communication.

Since the msg1 communication and the msg3 communication are transmitted prior to receiving the msg2 communication, the UE does not receive timing advance (TA) information for the transmission of the msg3 communication, which is indicated in the msg2 communication, prior to the transmission of the msg3 communication. The TA information may indicate an amount of time that a communication takes to travel from the UE to the BS. Thus, if the UE does not know the TA information, the UE may be unable to determine whether to delay or advance the transmission of the msg3 communication such that the msg3 communication arrives at the BS during an expected fast Fourier transform (FFT) engine window. As a result, the msg3 communication may arrive at the BS outside of the expected FFT engine window, which may cause interference with other communications transmitted and/or received by the BS, may cause delays in synchronizing the connection in the uplink direction, and/or the like.

Some aspects described herein provide techniques and apparatuses for timing control for random access channel (RACH) procedures. In some aspects, a UE and/or a BS may determine an estimated timing advance (TA) for transmitting a msg3 communication in a two-step RACH procedure. Since, in the two-step RACH procedure, the UE transmits the msg3 communication prior to receiving TA information in a msg2 communication from the BS, the UE may apply a UE-estimated TA to the transmission of the msg3 communication, and/or the BS may use a BS-estimated TA when decoding the msg3 communication. In this way, the UE-estimated TA and/or the BS-estimated TA may be used to compensate for the distance between the UE and the BS in the absence of TA information that is typically indicated in a msg2 communication. This permits the UE to more accurately schedule the transmission of the msg3 communication and/or permits the BS to identify an FFT engine window in which to decode the msg3 communication, both of which may reduce interference with other communications received at the BS and may reduce delays in synchronizing the connection between the UE and the BS in the uplink direction.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
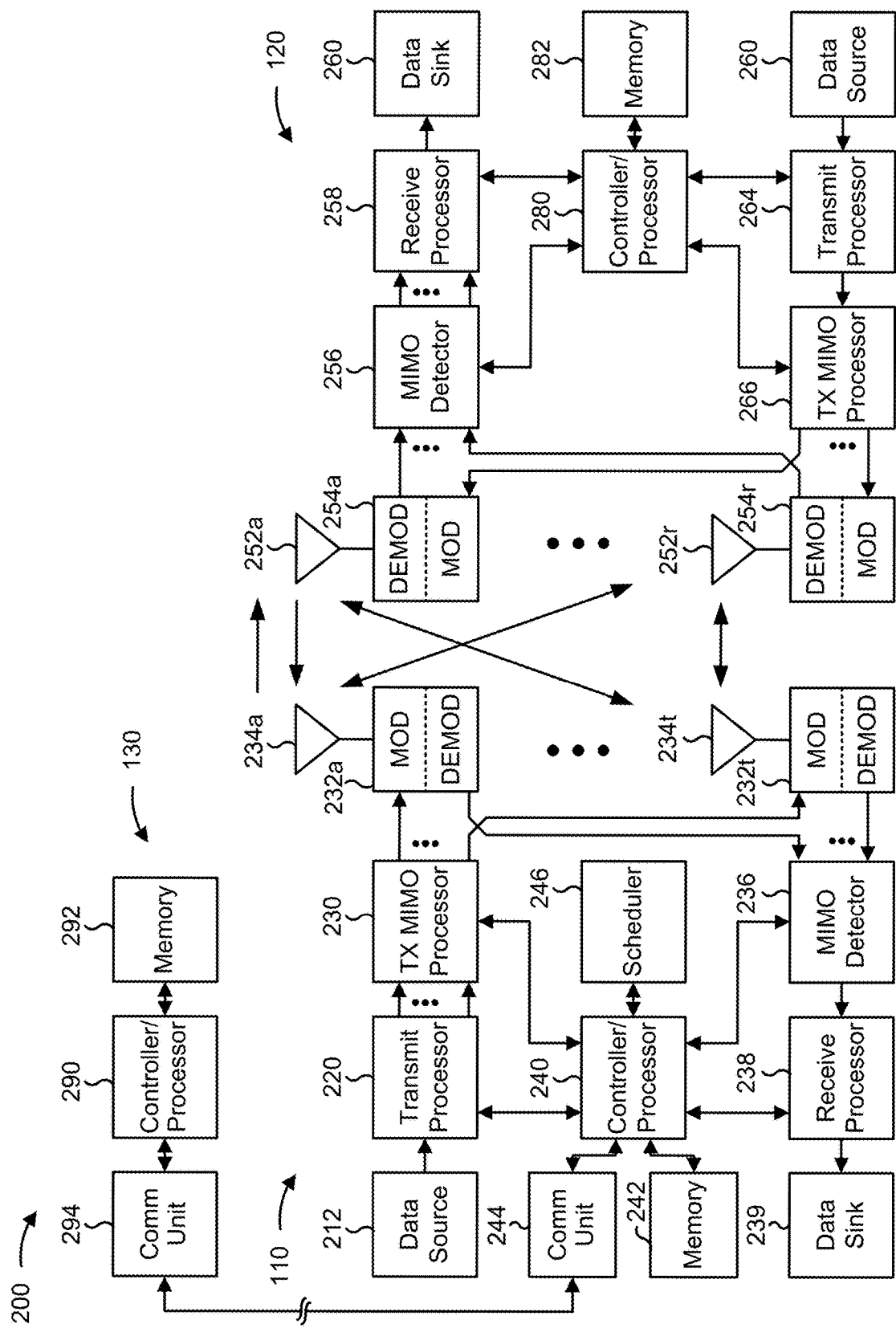
FIG. 2 is a block diagram conceptually illustrating an example of a base station in communication with a UE in a wireless network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform one or more techniques associated with timing control for random access channel (RACH), as described in more detail elsewhere herein. For example, controller/processor 240 of BS 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for BS 110 and UE 120, respectively. A scheduler 246 may schedule UEs for data transmission on the downlink and/or uplink.

Figure 6:
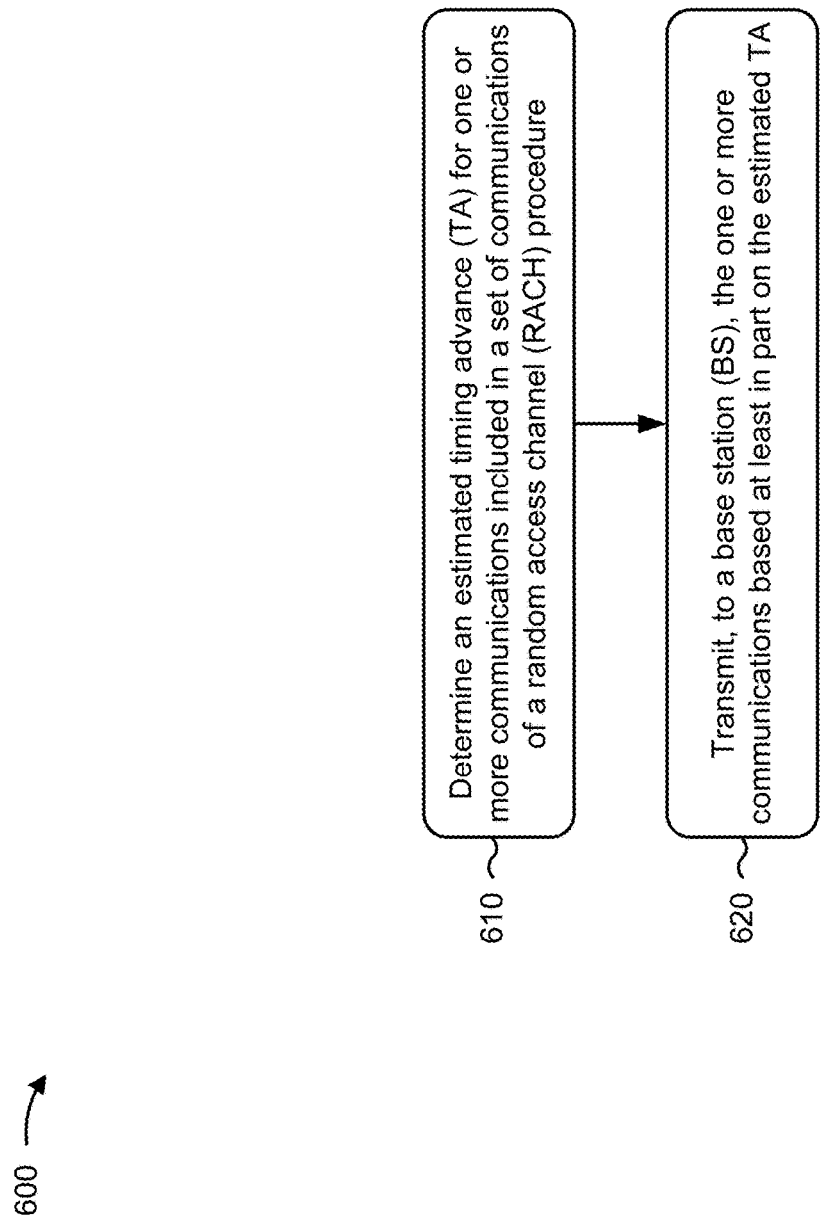
FIG. 6 is a diagram illustrating an example process performed, for example, by a user equipment, in accordance with various aspects of the present disclosure.
Figure 7:
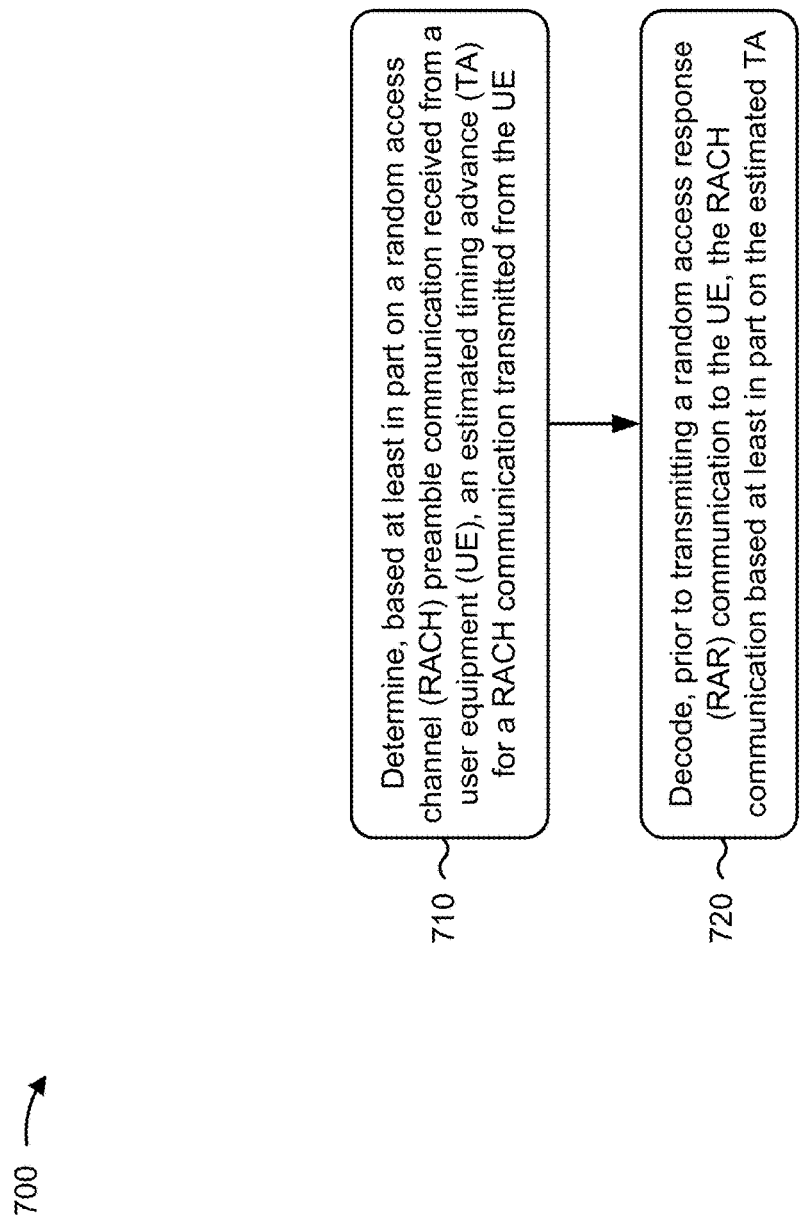
FIG. 7 is a diagram illustrating an example process performed, for example, by a base station, in accordance with various aspects of the present disclosure.
Figure 8:
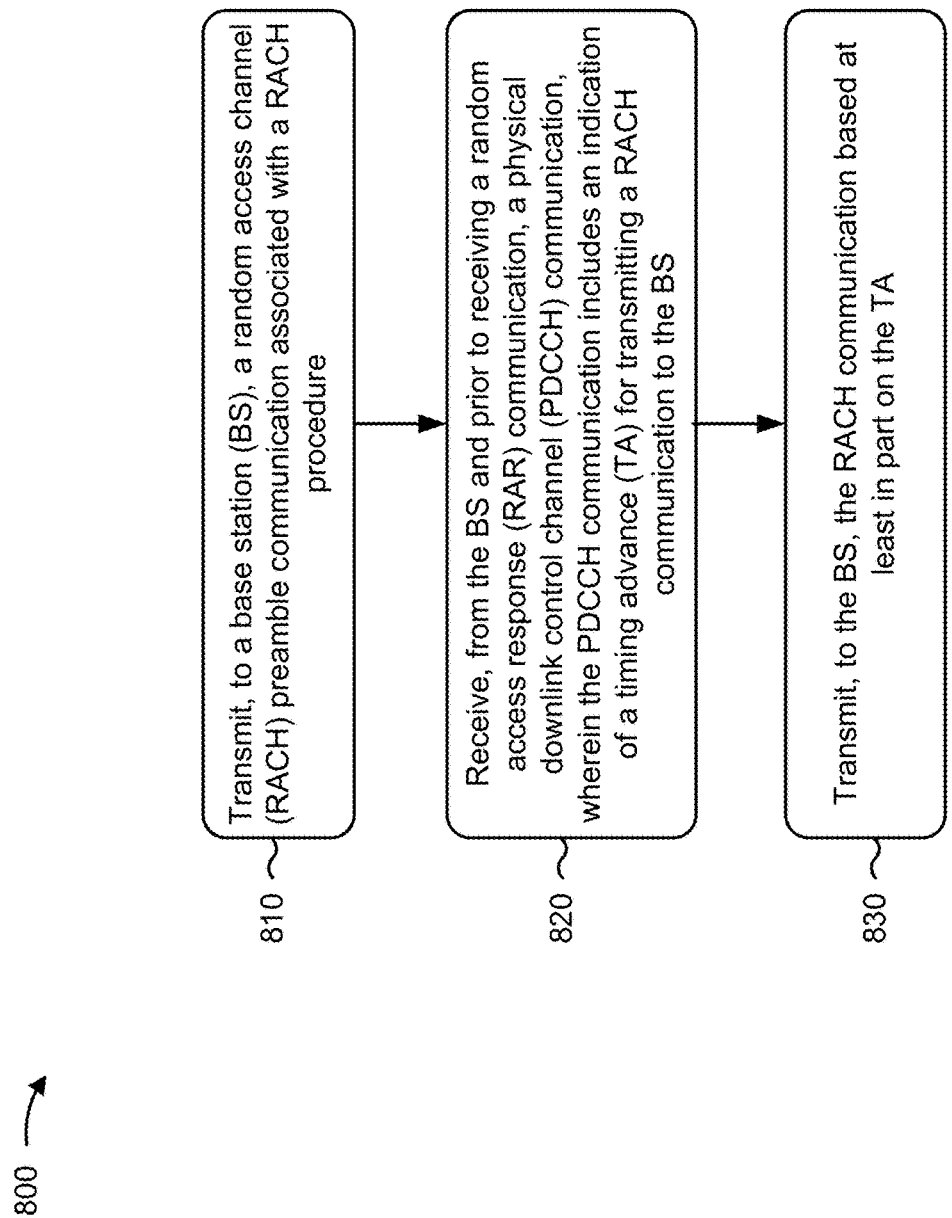
FIG. 8 is a diagram illustrating an example process performed, for example, by a user equipment, in accordance with various aspects of the present disclosure.

The stored program codes, when executed by processor 280 and/or other processors and modules at UE 120, may cause the UE 120 to perform operations described with respect to process 600 of FIG. 6, process 800 of FIG. 8, and/or other processes as described herein. The stored program codes, when executed by processor 240 and/or other processors and modules at BS 110, may cause the BS 110 to perform operations described with respect to process 700 of FIG. 7, process 900 of FIG. 9, and/or other processes as described herein. A scheduler 246 may schedule UEs for data transmission on the downlink and/or uplink.

In some aspects, UE 120 may include means for determining an estimated TA for one or more communications included in a set of communications of a RACH procedure, means for transmitting, to a BS 110, the one or more communications based at least in part on the estimated TA, and/or the like. In some aspects, UE 120 may include means for transmitting, to a BS 110, a RACH preamble communication associated with a RACH procedure, means for receiving, from the BS 110 and prior to receiving an RAR communication, a PDCCH communication, wherein the PDCCH communication includes an indication of a TA for transmitting a RACH communication to the BS 110, means for transmitting, to the BS 110, the RACH communication based at least in part on the TA, and/or the like. In some aspects, such means may include one or more components of UE 120 described in connection with FIG. 2.

In some aspects, BS 110 may include means for determining, based at least in part on a RACH preamble communication received from a UE 120, an estimated TA for a RACH communication transmitted from the UE 120, means for decoding, prior to transmitting an RAR communication to the UE 120, a msg3 communication based at least in part on the estimated TA, and/or the like. In some aspects, BS 110 may include means for receiving, from a UE 120, a RACH preamble communication associated with a RACH procedure, means for transmitting, to the UE 120 and prior to transmitting an RAR communication to the UE 120, a PDCCH communication, wherein the PDCCH communication includes an indication of a TA for transmitting a msg3 communication to the BS 110, and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided merely as an example. Other examples may differ from what is described with regard to FIG. 2.

Figure 3:
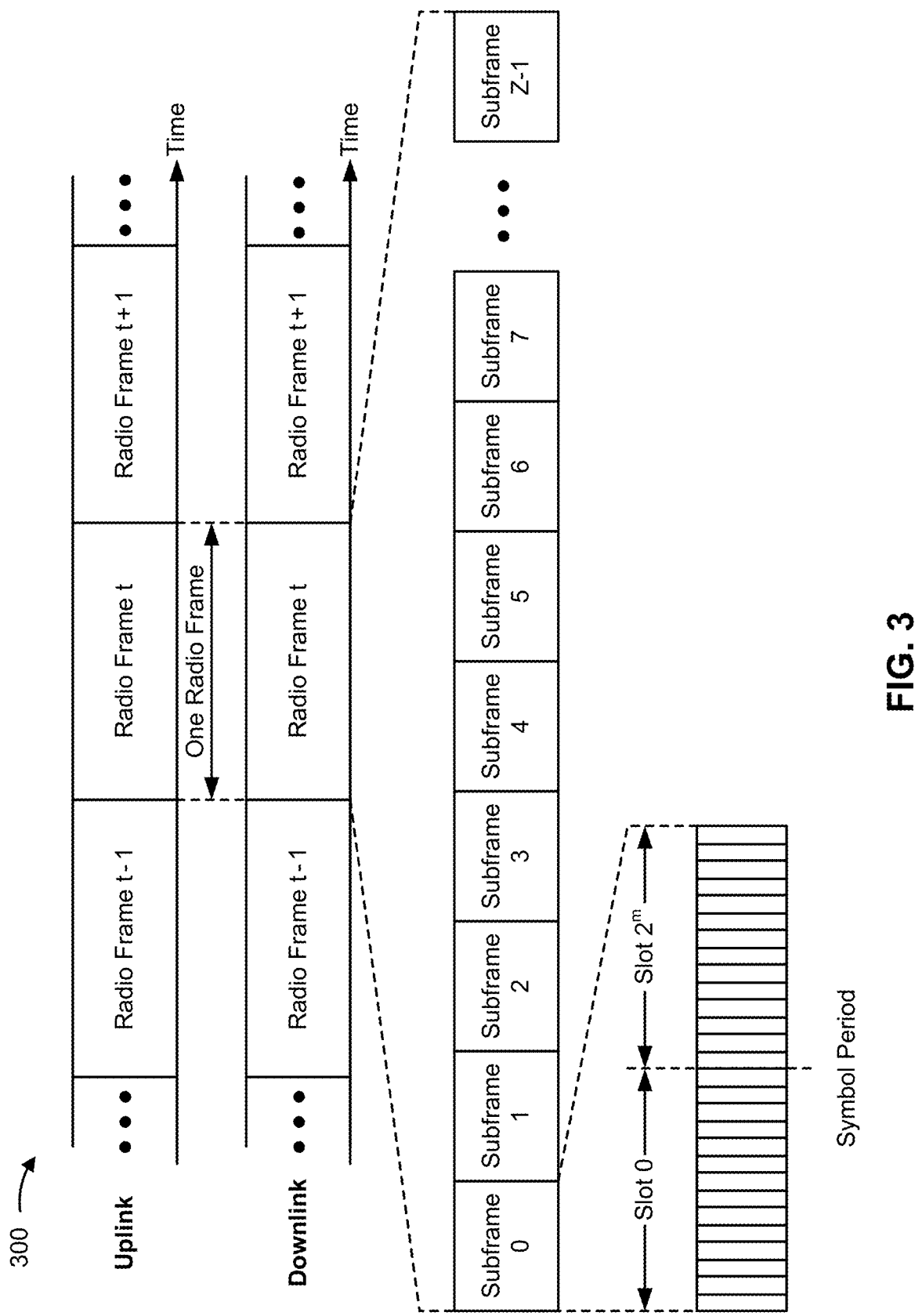
FIG. 3 is a block diagram conceptually illustrating an example of a frame structure in a wireless network, in accordance with various aspects of the present disclosure.

FIG. 3 shows an example frame structure 300 for FDD in a wireless network (e.g., wireless network 100). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In some aspects, a UE may transmit on various channels in an uplink frame and/or subframe. As an example, a UE may transmit on one or more physical random access channels (PRACHs) in order to perform a RACH procedure to establish initial system access and uplink synchronization with a BS. A BS may transmit one or more synchronization signals, such as a primary synchronization signal (PSS), a secondary synchronization signal (SSS), and/or the like, on the downlink for each cell supported by the base station. The PSS and SSS may be used by the UE to identify the BS and perform the initial system access. For example, the PSS may be used by the UE to determine symbol timing, and the SSS may be used by the UE to determine a physical cell identifier, associated with the base station, and frame timing. The base station may also transmit a physical broadcast channel (PBCH). The PBCH may carry some system information, such as system information that supports initial access by the UE.

As indicated above, FIG. 3 is provided as an example. Other examples may differ from what is described with regard to FIG. 3.

Figure 4:
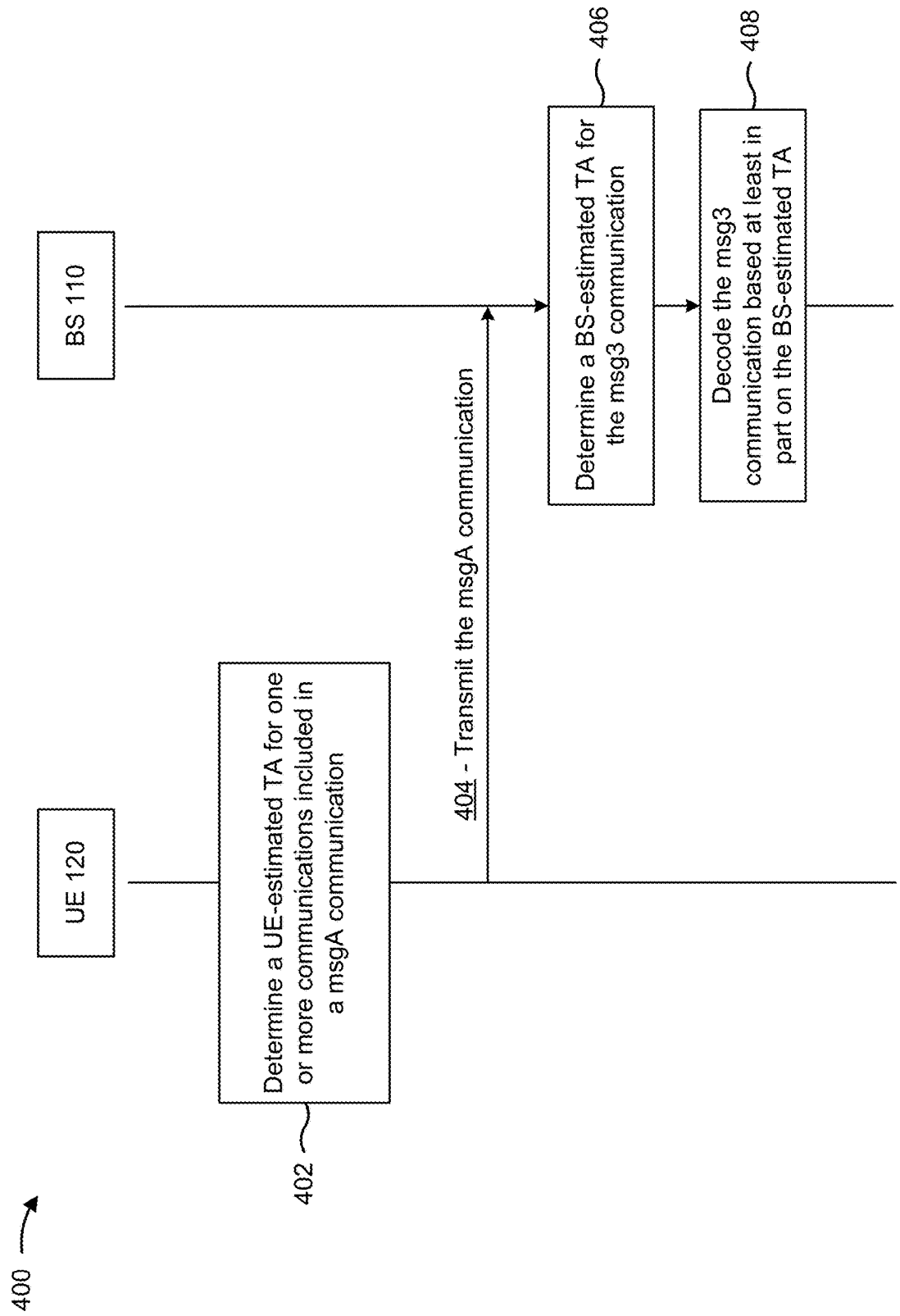
FIGS. 4 and 5 are diagrams illustrating examples of timing control for random access channel (RACH), in accordance with various aspects of the present disclosure.

FIG. 4 is a diagram illustrating an example 400 of timing control for RACH, in accordance with various aspects of the present disclosure. As shown in FIG. 4, example 400 may include a user equipment (e.g., UE 120) and a base station (e.g., BS 110). In some aspects, BS 110 and UE 120 may be included in a wireless network (e.g., wireless network 100). In some aspects, BS 110 and UE 120 may establish a connection using a two-step RACH procedure.

To initiate the two-step RACH procedure, UE 120 may determine to transmit a msgA communication to BS 110. The msgA communication may include a set of communications that includes a msg1 communication (e.g., a RACH preamble communication) and a msg3 communication (e.g., an RRC connection request communication, an on-demand system information block (SIB) communication, and/or the like).

As shown in FIG. 4, and by reference number 402, UE 120 may determine a UE-estimated TA for one or more communications included in the msgA communication. For example, UE 120 may determine a UE-estimated TA for the msg1 communication and the msg3 communication, may determine a UE-estimated TA for only the msg3 communication, and/or the like. In this way, UE 120 may transmit the msg1 communication and/or the msg3 communication with the UE-estimated TA in the absence of receiving a TA in a msg2 communication.

In some aspects, since a TA may not be needed for the transmission of the msg1 communication, UE 120 may apply the UE-estimated TA only to the transmission of the msg3 communication. In this case, UE 120 may include, in either the msg1 communication or the msg3 communication, an indication of the UE-estimated TA and an indication that the UE-estimated TA was applied to the transmission of the msg3 communication. In this way, BS 110 may receive the msgA communication and may determine which of the communications included in the msgA communication were transmitted with the UE-estimated TA.

In some aspects, UE 120 may determine the UE-estimated TA based at least in part on a pathloss on a downlink between UE 120 and BS 110. For example, UE 120 may use the pathloss as an indicator of the distance between UE 120 and BS 110 (e.g., the greater the pathloss, the further away UE 120 may be to BS 110, and the lesser the pathloss, the closer to UE 120 may be to BS 110), and thus the corresponding UE-estimated TA that is to be applied to the transmission of the msg1 communication and/or the msg3 communication.

In some aspects, UE 120 may determine the pathloss based at least in part on one or more synchronization signals that are transmitted from BS 110 in an SSB, such as a PSS, an SSS, and/or the like. For example, UE 120 may determine a received signal strength of a synchronization signal transmitted from BS 110, may determine a beamforming gain (or transmit gain) associated with the synchronization signal, and may determine the pathloss based at least in part on the difference between the beamforming gain and the received signal strength. In some aspects, UE 120 may determine the beamforming gain associated with the synchronization signal by identifying an indication of the beamforming gain in a master information block (MIB) or system information block (SIB) associated with the SSB.

In some cases, pathloss of a synchronization signal may occur due to factors other than distance between UE 120 and BS 110, such as obstructions due to differences in terrain, an object being located in the line-of-sight (LOS) between UE 120 and BS 110, and/or the like. In this case, UE 120 may try to determine whether the pathloss is due to distance between UE 120 and BS 110 (and thus may be used to determine the UE-estimated TA) or due to a non-line-of-sight (NLOS) condition (and thus it may be preferable for pathloss not to be used to determine the UE-estimated TA). If UE 120 determines that a NLOS condition exists, UE 120 may reattempt the two-step RACH procedure on another beam associated with BS 110.

In some aspects, UE 120 may determine a plurality of UE-estimated TAs in order to increase the likelihood that the msg3 communication is capable of being received and successfully decoded at BS 110. For example, UE 120 may determine respective UE-estimated TAs for a plurality of iterations of the msg1 communication and/or the msg3 communication. In this way, BS 110 may receive the msg1 communication from UE 120, may determine an optimal TA for the msg3 communication (e.g., a TA that would cause the msg3 communication to arrive in a particular FFT engine window), and may determine to receive only the iteration of the msg3 communication that was transmitted with UE-estimated TA corresponding to the optimal TA determined by BS 110.

In some aspects, UE 120 may determine a plurality of sets of TAs (e.g., UE-estimated TAs or preconfigured TAs) for a plurality of sets of iterations of the msg1 communication and/or the msg3 communication. In this way, UE 120 may transmit respective sets of iterations on respective uplink beams of a plurality of uplink beams transmitted from BS 110.

In some aspects, the quantity of iterations of the msg1 communication and/or the msg3 communication, for which UE 120 is to determine a respective TA, may be indicated in a MIB or remaining system information (RMSI) communication transmitted from BS 110. In some aspects, BS 110 may determine the quantity of iterations based at least in part on a cell type associated with BS 110 (e.g., whether BS 110 is a macro cell, small cell, and/or the like), based at least in part on a frequency range in which BS 110 is operating, based at least in part on a quantity of uplink beams transmitted from BS 110, and/or the like.

As further shown in FIG. 4, and by reference number 404, UE 120 may transmit a msgA communication to BS 110. In some aspects, the msgA communication may include a msg1 communication and a msg3 communication. In some aspects, UE 120 may transmit the msg3 communication, or the msg1 communication and the msg3 communication, based at least in part on a UE-estimated TA. For example, UE 120 may delay the transmission of the msg1 communication and/or the msg3 communication based at least in part on the UE-estimated TA, may advance the transmission of the msg1 communication and/or the msg3 communication based at least in part on the UE-estimated TA, and/or the like.

As further shown in FIG. 4, and by reference number 406, BS 110 may determine a BS-estimated TA for the msg3 communication. In some aspects, BS 110 may determine the BS-estimated TA in aspects where the msg3 communication was transmitted with a UE-estimated TA. In some aspects, BS 110 may determine the BS-estimated TA in aspects where the msg3 communication was transmitted without a UE-estimated TA.

In some aspects, BS 110 may determine the BS-estimated TA based at least in part on the msg1 communication transmitted from UE 120. For example, BS 110 may estimate a propagation delay between UE 120 and BS 110 based at least in part on a frequency at which the msg1 communication was transmitted and a difference between a time at which the msg1 communication was transmitted (e.g., as indicated in the msg1 communication) and a time at which the msg1 communication was received at BS 110. In this way, BS 110 may determine a BS-estimated TA, based at least in part on the RTT, that would cause the msg3 communication to arrive at BS 110 during a particular FFT engine window for receiving the msg3 communication. If UE 120 applied a UE-estimated TA to the transmission of the msg1 communication, BS 110 may identify an indication of the UE-estimated TA in the msg1 communication, and further determine the BS-estimated TA by taking the UE-estimated TA into account (e.g., BS 110 may determine the BS-estimated TA relative to the UE-estimated TA).

As further shown in FIG. 4, and by reference number 408, BS 110 may receive and decode the msg3 communication based at least in part on the BS-estimated TA. In some aspects, BS 110 may decode the msg3 communication using an input sample timing that is different from an input sample timing that was used to decode the msg1 communication based at least in part on the BS-estimated TA. For example, BS 110 may determine to use an input sample timing, that is different from the input sample timing that was used to decode the msg1 communication, based at least in part on a quantity of other msg1 communications received in a same slot as the msg1 communication, based at least in part on a quantity of available FFT engines associated with BS 110, and/or the like.

In some aspects, BS 110 may use the input sample timing to determine a particular FFT engine window in which to decode the msg3 communication. For example, BS 110 may determine that the input sample timing corresponds to one or more OFDM symbols that bound the particular FFT engine window. In some aspects, BS 110 may apply a TA correction to buffer or delay the reception of the msg3 communication based at least in part on determining that the msg3 communication would arrive at BS 110 prior to the particular FFT engine window for decoding the msg3 communication. As another example, BS 110 may select a new FFT engine window, in which to decode the msg3 communication, based at least in part on determining that the msg3 communication is to arrive at BS 110 after the particular FFT engine window. In some aspects, BS 110 may further determine an FFT engine window, in which to decode the msg3 communication, based at least in part on whether there is a gap (and on a size of the gap) in time between the transmission of the msg1 communication and the transmission of the msg3 communication, whether there is other data multiplexed with the msg3 communication, and/or the like.

In this way, the UE-estimated TA and/or the BS-estimated TA may be used to compensate for the distance between UE 120 and BS 110 in the absence of TA information that is typically indicated in a msg2 communication. This permits UE 120 to more accurately schedule the transmission of the msg3 communication and/or permits BS 110 to identify an FFT engine window in which to decode the msg3 communication, both of which may reduce interference with other communications received at BS 110 and may reduce delays in synchronizing the connection between UE 120 and BS 110 in the uplink direction.

As indicated above, FIG. 4 is provided as an example. Other examples may differ from what is described with respect to FIG. 4.

Figure 5:
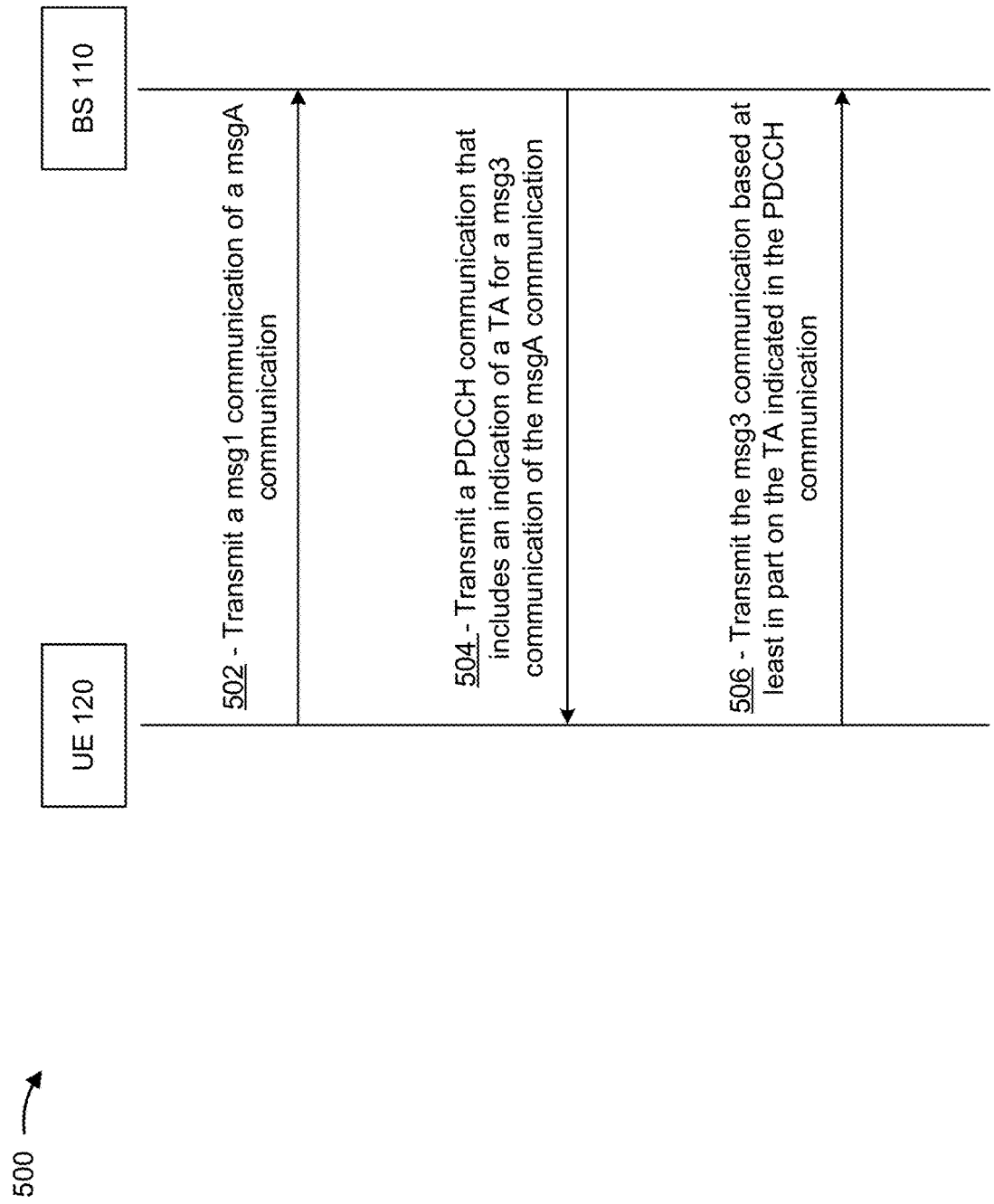

FIG. 5 is a diagram illustrating an example 500 of timing control for random access channel (RACH), in accordance with various aspects of the present disclosure. As shown in FIG. 5, example 500 may include a user equipment (e.g., UE 120) and a base station (e.g., BS 110). In some aspects, BS 110 and UE 120 may be included in a wireless network (e.g., wireless network 100). In some aspects, BS 110 and UE 120 may establish a connection using a two-step RACH procedure.

As shown in FIG. 5, and by reference number 502, to initiate the two-step RACH procedure, UE 120 may transmit a msg1 communication of a msgA communication. BS 110 may receive the msg1 communication and may determine, based at least in part on the transmission of the msg1 communication, a TA for the transmission of a msg3 communication of the msgA. For example, BS 110 may determine a time at which the msg1 communication was transmitted and a frequency on which the msg1 communication was transmitted, and may determine a propagation delay (and thus the TA) between BS 110 and UE 120 based at least in part on a transmission speed of the msg1 communication (e.g., based on the frequency) and/or a time duration between the time at which UE 120 transmitted the msg1 communication and a time at which BS 110 received the communication.

As further shown in FIG. 5, and by reference number 504, BS 110 may transmit a physical downlink control channel (PDCCH) communication to UE 120. The PDCCH communication may be a communication that is transmitted prior to the transmission of a msg2 communication that is to be transmitted, by BS 110, as part of a msgB communication. The PDCCH communication may include scheduling information for the msg2 communication. In some aspects, BS 110 may incorporate the TA, for transmission of the msg3 communication, into the PDCCH communication. In this way, UE 120 may receive the TA, for the transmission of the msg3 communication, prior to transmitting the msg3 communication and prior to BS 110 transmitting the msg2 communication that typically includes the TA for the transmission of the msg3 communication.

As further shown in FIG. 5, and by reference number 506, UE 120 may receive the PDCCH communication, may identify the TA for the transmission of the msg3 communication, and may apply the TA to the transmission of the msg3 communication. For example, UE 120 may delay the transmission of the msg3 communication based at least in part on the TA, may advance the transmission of the msg3 communication based at least in part on the TA, and/or the like.

In this way, UE 120 may receive the TA for the msg3 communication prior to the transmission of the msg2 communication while the structure of the two-step RACH procedure is maintained.

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where a UE (e.g., UE 120) performs timing control for RACH.

As shown in FIG. 6, process 600 may include determining an estimated TA for one or more communications included in a set of communications of a RACH procedure (block 610). For example, the UE (e.g., using receive processor 258, transmit processor 264, controller/processor 280, memory 282, and/or the like) may determine an estimated TA for one or more communications included in a set of communications of a RACH procedure, as described above.

As further shown in FIG. 6, process 600 may include transmitting, to a BS, the one or more communications based at least in part on the estimated TA (block 620). For example, the UE (e.g., using transmit processor 264, controller/processor 280, memory 282, and/or the like) may transmit, to a BS, the one or more communications based at least in part on the estimated TA, as described above.

Process 600 may include additional aspects, such as any single implementation or any combination of aspects described below and/or in connection with one or more other processes described elsewhere herein.

In a first aspect, the set of communications comprises a two-step RACH msgA communication, a four-step RACH msg1 communication, or a four-step msg3 communication. In a second aspect, alone or in combination with the first aspect, determining the estimated TA comprises: determining the estimated TA based at least in part on a pathloss on a downlink associated with the BS. In a third aspect, alone or in combination with one or more of the first and second aspects, process 600 comprises determining the pathloss based at least in part on an SSB transmitted from the BS. In a fourth aspect, alone or in combination with one or more of the first through third aspects, determining the pathloss based at least in part on the SSB transmitted from the BS comprises determining the pathloss based at least in part on a beamforming gain, associated with the SSB, indicated in a MIB or SIB associated with the SSB.

In a fifth aspect, alone or in combination with one or more of the first through fourth aspects, process 600 comprises determining the estimated TA based at least in part on whether there is LOS or NLOS between the UE and the BS. In a sixth aspect, alone or in combination with one or more of the first through fifth aspects, the one or more communications comprise a RACH preamble communication and a msg3 communication. In a seventh aspect, alone or in combination with one or more of the first through sixth aspects, the one or more communications include an indication of the estimated TA. In an eighth aspect, alone or in combination with one or more of the first through seventh aspects, determining the estimated TA for the one or more communications comprises determining respective estimated TAs for a plurality of iterations of the one or more communications, and transmitting the one or more communications based at least in part on the estimated TA comprises transmitting the plurality of iterations of the one or more communications based at least in part on the respective estimated TAs.

In a ninth aspect, alone or in combination with one or more of the first through tenth aspects, a quantity of iterations, included in the plurality of iterations of the one or more communications, is indicated in a MIB or an RMSI communication. In an eleventh aspect, alone or in combination with one or more of the first through tenth aspects, a quantity of iterations, included in the plurality of iterations of the one or more communications, is based at least in part on a cell type associated with the BS. In a twelfth aspect, alone or in combination with one or more of the first through eleventh aspects, transmitting the plurality of iterations of the one or more communications comprises transmitting the plurality of iterations of the one or more communications on respective uplink beams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a BS, in accordance with various aspects of the present disclosure. Example process 700 is an example where a BS (e.g., BS 10) performs timing control for RACH.

As shown in FIG. 7, process 700 may include determining, based at least in part on a RACH preamble communication received from a UE, an estimated TA for a RACH communication transmitted from the UE (block 710). For example, the BS (e.g., using transmit processor 220, receive processor 238, controller/processor 240, memory 242, and/or the like) may determine, based at least in part on a RACH preamble communication received from a UE, an estimated TA for a RACH communication transmitted from the UE, as described above.

As further shown in FIG. 7, process 700 may include decoding, prior to transmitting an RAR communication to the UE, the msg3 communication based at least in part on the estimated TA (block 720). For example, the BS (e.g., using transmit processor 220, receive processor 238, controller/processor 240, memory 242, and/or the like) may decode, prior to transmitting an RAR communication to the UE, the RACH communication based at least in part on the estimated TA, as described above.

Process 700 may include additional aspects, such as any single implementation or any combination of aspects described below and/or in connection with one or more other processes described elsewhere herein.

In a first aspect, determining the estimated TA for the RACH communication comprises determining the estimated TA for the RACH communication based at least in part on a TA applied to the RACH preamble communication. In a second aspect, alone or in combination with the first aspect, decoding the RACH communication based at least in part on the estimated TA comprises applying a TA correction to the RACH communication when decoding the RACH communication.

In a third aspect, alone or in combination with one or more of the first and second aspects, decoding the RACH communication comprises decoding the RACH communication using an input sample timing that is different from an input sample timing used to decode the RACH preamble communication. In a fourth aspect, alone or in combination with one or more of the first through third aspects, the input sample timing, that is used to decode the RACH communication, is used to determine one or more OFDM symbol boundaries at an FFT engine that is used to decode the msg3.

In a fifth aspect, alone or in combination with one or more of the first through fourth aspects, decoding the RACH communication comprises determining, based at least in part on a quantity of other RACH preamble communications received in a slot in which the RACH preamble communication is received, to decode the RACH communication using an input sample timing that is different from an input sample timing used to decode the RACH preamble communication, and decoding, based at least in part on determining to decode the RACH communication using the input sample timing that is different from the input sample timing used to decode the RACH preamble communication, the RACH communication using the input sample timing that is different from the input sample timing used to decode the RACH preamble communication.

In a sixth aspect, alone or in combination with one or more of the first through fifth aspects, decoding the RACH communication comprises determining, based at least in part on a quantity of available fast FFT engines associated with the BS, to decode the RACH communication using an input sample timing that is different from an input sample timing used to decode the RACH preamble communication, and decoding, based at least in part on determining to decode the RACH communication using the input sample timing that is different from the input sample timing used to decode the RACH preamble communication, the RACH communication using the input sample timing that is different from the input sample timing used to decode the RACH preamble communication.

In a seventh aspect, alone or in combination with one or more of the first through sixth aspects, the RACH communication comprises a payload portion of a two-step RACH msgA communication. In an eighth aspect, alone or in combination with one or more of the first through seventh aspects, the RACH communication comprises a four-step RACH msg3 communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a UE, in accordance with various aspects of the present disclosure. Example process 800 is an example where a UE (e.g., UE 120) performs timing control for RACH.

As shown in FIG. 8, process 800 may include transmitting, to a BS, a RACH preamble communication associated with a two-step RACH procedure (block 810). For example, the UE (e.g., using transmit processor 264, controller/processor 280, memory 282, and/or the like) may transmit, to a BS, a RACH preamble communication associated with a two-step RACH procedure, as described above.

As further shown in FIG. 8, process 800 may include receiving, from the BS and prior to receiving an RAR communication, a PDCCH communication, wherein the PDCCH communication includes an indication of a TA for transmitting a RACH communication to the BS (block 820). For example, the UE (e.g., using receive processor 258, controller/processor 280, memory 282, and/or the like) may receive, from the BS and prior to receiving an RAR communication, a PDCCH communication, as described above. In some aspects, the PDCCH communication includes an indication of a TA for transmitting a RACH communication to the BS.

As further shown in FIG. 8, process 800 may include transmitting, to the BS, the RACH communication based at least in part on the TA (block 830). For example, the UE (e.g., using transmit processor 264, controller/processor 280, memory 282, and/or the like) may transmit, to the BS, the RACH communication based at least in part on the TA, as described above.

Process 800 may include additional aspects, such as any single implementation or any combination of aspects described below and/or in connection with one or more other processes described elsewhere herein.

In a first aspect, the PDCCH communication includes scheduling information associated with the RAR communication. In a second aspect, alone or in combination with the first aspect, the RACH communication comprises a payload portion of a two-step RACH msgA communication. In a third aspect, alone or in combination with one or more of the first and second aspects, the RACH communication comprises a four-step RACH msg3 communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
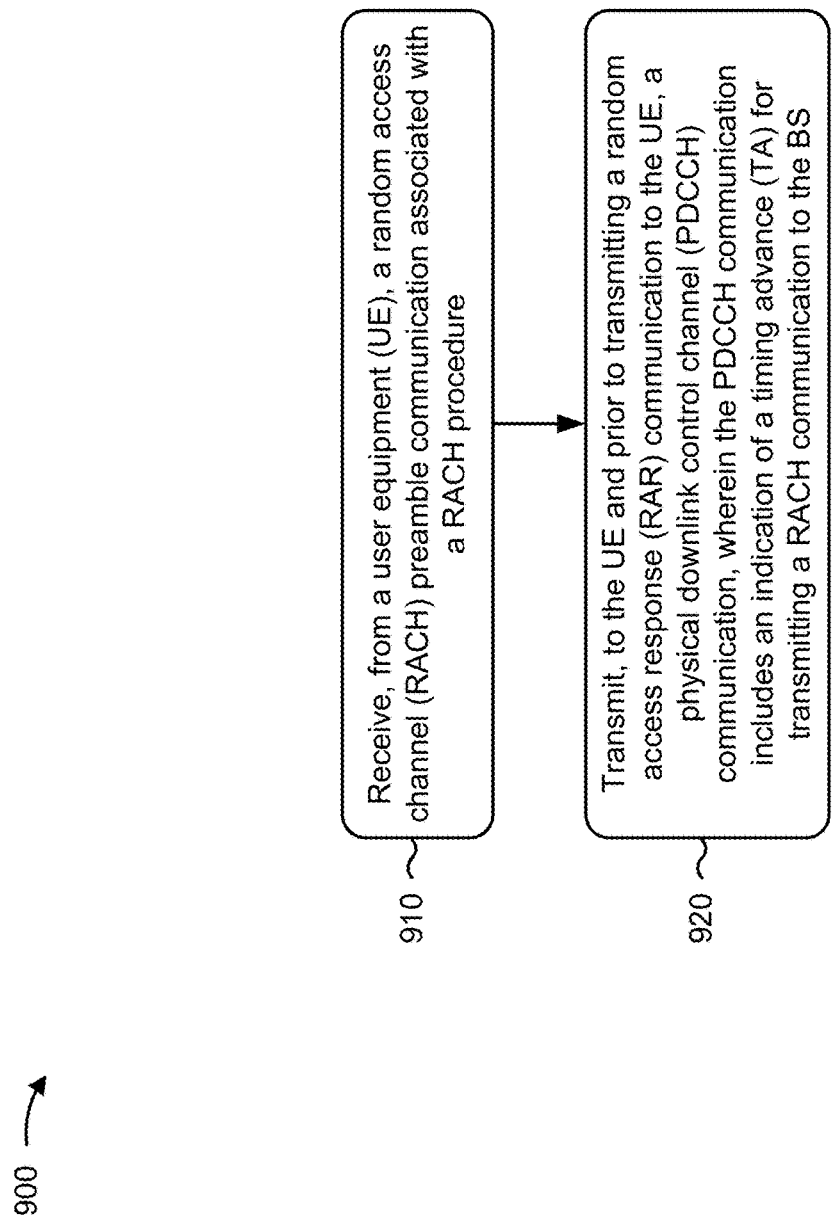
FIG. 9 is a diagram illustrating an example process performed, for example, by a base station, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110) performs timing control for RACH.

As shown in FIG. 9, process 900 may include receiving, from a UE, a RACH preamble communication associated with a two-step RACH procedure (block 910). For example, the BS (e.g., using receive processor 238, controller/processor 240, memory 242, and/or the like) may receive, from a UE, a RACH preamble communication associated with a two-step RACH procedure, as described above.

As further shown in FIG. 9, process 900 may include transmitting, to the UE and prior to transmitting an RAR communication to the UE, a PDCCH communication, wherein the PDCCH communication includes an indication of a TA for transmitting a RACH communication to the BS (block 920). For example, the BS (e.g., using transmit processor 220, receive processor 238, controller/processor 240, memory 242, and/or the like) may transmit, to the UE and prior to transmitting an RAR communication to the UE, a PDCCH communication, as described above. In some aspects, the PDCCH communication includes an indication of a TA for transmitting a RACH communication to the BS.

Process 900 may include additional aspects, such as any single implementation or any combination of aspects described below and/or in connection with one or more other processes described elsewhere herein.

In a first aspect, the PDCCH communication includes scheduling information associated with the RAR communication. In some aspects, the TA for transmitting the RACH communication to the BS is based at least in part on the RACH preamble communication. In a second aspect, alone or in combination with the first aspect, the RACH communication comprises a payload portion of a two-step RACH msgA communication. In a third aspect, alone or in combination with one or more of the first and second aspects, the RACH communication comprises a four-step RACH msg3 communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
   receiving a msgA communication of a two-step random access channel (RACH) procedure;
   determining, based at least in part on a frequency at which a preamble portion of the msgA communication is transmitted and a difference between a time at which the preamble portion is transmitted and a time at which the preamble portion is received at the network entity, a network-entity-estimated timing advance (TA) for a payload portion of the msgA communication; and
   decoding, prior to transmitting a random access response (RAR) communication, the payload portion based at least in part on the network-entity-estimated TA.

2. The method of claim 1, further comprising:
   determining another estimated TA for the payload portion based at least in part on a TA applied to the preamble portion; and
   wherein decoding the payload portion comprises:
   decoding the payload portion based at least in part on the other estimated TA.

3. The method of claim 1, wherein decoding the payload portion based at least in part on the network-entity-estimated TA comprises:
   applying a TA correction to the payload portion when decoding the payload portion,
      wherein the TA correction is determined based at least in part on the network-entity-estimated TA.

4. The method of claim 1, wherein decoding the payload portion comprises:
   decoding the payload portion using an input sample timing that is different from an input sample timing used to decode the preamble portion.

5. The method of claim 4, wherein the input sample timing, that is used to decode the payload portion, is used to determine one or more orthogonal frequency division multiplexing (OFDM) symbol boundaries at a fast Fourier transform (FFT) engine that is used to decode the payload portion.

6. The method of claim 1, wherein decoding the payload portion comprises:
   determining, based at least in part on a quantity of other RACH preamble communications received in a slot in which the preamble portion is received, to decode the payload portion using an input sample timing that is different from an input sample timing used to decode the preamble portion; and
   decoding, based at least in part on determining to decode the payload portion using the input sample timing that is different from the input sample timing used to decode the preamble portion, the payload portion using the input sample timing that is different from the input sample timing used to decode the preamble portion.

7. The method of claim 1, wherein decoding the payload portion comprises:
   determining, based at least in part on a quantity of available fast Fourier transform (FFT) engines associated with the network entity, to decode the payload portion using an input sample timing that is different from an input sample timing used to decode the preamble portion; and
   decoding, based at least in part on determining to decode the payload portion using the input sample timing that is different from the input sample timing used to decode the preamble portion, the payload portion using the input sample timing that is different from the input sample timing used to decode the preamble portion.

8. The method of claim 1,
   wherein msgA communication includes a plurality of copies of a payload that each are sent with a different TA, and
   wherein the payload portion that is decoded comprises a copy, of the plurality of copies of the payload, that is selected based on the network-entity-estimated TA.

9. A network entity for wireless communication, comprising:
   a memory; and
   one or more processors, coupled to the memory, configured to:
   receive a msgA communication of a two-step random access channel (RACH) procedure;
   determine, based at least in part on a frequency at which a preamble portion of the msgA communication is transmitted and a difference between a time at which the preamble portion is transmitted and a time at which the preamble portion is received at the network entity, a network-entity-estimated timing advance (TA) for a payload portion of the msgA communication; and
   decode, prior to transmitting a random access response (RAR) communication, the payload portion RACH communication based at least in part on the network-entity-estimated TA.

10. The network entity of claim 9, wherein the one or more processors are further configured to:
   determine another estimated TA for the payload portion based at least in part on a TA applied to the preamble portion; and
   wherein the one or more processors, when decoding the payload portion, are configured to:
   decode the payload portion based at least in part on the other estimated TA.

11. The network entity of claim 9, wherein the one or more processors, when decoding the payload portion based at least in part on the network-entity-estimated TA, are configured to:
   apply a TA correction to the payload portion when decoding the payload portion,
      wherein the TA correction is determined based at least in part on the network-entity-estimated TA.

12. The network entity of claim 9, wherein the one or more processors, when decoding the payload portion, are configured to:
   decode the payload portion using an input sample timing that is different from an input sample timing used to decode the preamble portion.

13. The network entity of claim 12, wherein the input sample timing, that is used to decode the payload portion, is used to determine one or more orthogonal frequency division multiplexing (OFDM) symbol boundaries at a fast Fourier transform (FFT) engine that is used to decode the payload portion.

14. The network entity of claim 9, wherein the one or more processors, when decoding the payload portion, are configured to:
  determine, based at least in part on a quantity of other RACH preamble communications received in a slot in which the preamble portion is received, to decode the payload portion using an input sample timing that is different from an input sample timing used to decode the preamble portion; and
  decode, based at least in part on determining to decode the payload portion using the input sample timing that is different from the input sample timing used to decode the preamble portion, the payload portion using the input sample timing that is different from the input sample timing used to decode the preamble portion.

15. The network entity of claim 9, wherein the one or more processors, when decoding the payload portion, are configured to:
  determine, based at least in part on a quantity of available fast Fourier transform (FFT) engines associated with the network entity, to decode the payload portion using an input sample timing that is different from an input sample timing used to decode the preamble portion; and
  decode, based at least in part on determining to decode the payload portion using the input sample timing that is different from the input sample timing used to decode the preamble portion, the payload portion using the input sample timing that is different from the input sample timing used to decode the preamble portion.

16. The network entity of claim 9,
  wherein the msgA communication includes a plurality of copies of a payload that each are sent with a different TA, and
  wherein the payload portion that is decoded comprises a copy, of the plurality of copies of the payload, that is selected based on the network-entity-estimated TA.

17. A non-transitory computer-readable medium storing a set of instructions for wireless communication, the set of instructions comprising:
  one or more instructions that, when executed by one or more processors of a network entity, cause the network entity to:
    receive a msgA communication of a two-step random access channel (RACH) procedure;
    determine, based at least in part on a frequency at which a preamble portion of the msgA communication is transmitted and a difference between a time at which the preamble portion is transmitted and a time at which the preamble portion is received at the network entity, a network-entity-estimated timing advance (TA) for a payload portion of the msgA communication; and
    decode, prior to transmitting a random access response (RAR) communication, the payload portion based at least in part on the network-entity-estimated TA.

18. The non-transitory computer-readable medium of claim 17, wherein the one or more instructions further cause the network entity to:
  determine another estimated TA for the payload portion based at least in part on a TA applied to the preamble portion; and
  wherein the one or more instructions, that cause the network entity to decode the payload portion, cause the network entity to:
    decode the payload portion based at least in part on the other estimated TA.

19. The non-transitory computer-readable medium of claim 17, wherein the one or more instructions, that cause the network entity to decode the payload portion based at least in part on the network-entity-estimated TA, cause the network entity to:
  apply a TA correction to the payload portion when decoding the payload portion,
    wherein the TA correction is determined based at least in part on the network-entity-estimated TA.

20. The non-transitory computer-readable medium of claim 17, wherein the one or more instructions, that cause the network entity to decode the payload portion, cause the network entity to:
  decode the payload portion using an input sample timing that is different from an input sample timing used to decode the preamble portion.

21. The non-transitory computer-readable medium of claim 20, wherein the input sample timing, that is used to decode the payload portion, is used to determine one or more orthogonal frequency division multiplexing (OFDM) symbol boundaries at a fast Fourier transform (FFT) engine that is used to decode the payload portion.

22. The non-transitory computer-readable medium of claim 17, wherein the one or more instructions, that cause the network entity to decode the payload portion, cause the network entity to:
  determine, based at least in part on a quantity of other preamble communications received in a slot in which the preamble portion is received, to decode the payload portion using an input sample timing that is different from an input sample timing used to decode the preamble portion; and
  decode, based at least in part on determining to decode the payload portion using the input sample timing that is different from the input sample timing used to decode the preamble portion, the payload portion using the input sample timing that is different from the input sample timing used to decode the preamble portion.

23. The non-transitory computer-readable medium of claim 17, wherein the one or more instructions, that cause the network entity to decode the payload portion, cause the network entity to:
  determine, based at least in part on a quantity of available fast Fourier transform (FFT) engines associated with the network entity, to decode the payload portion using an input sample timing that is different from an input sample timing used to decode the preamble portion; and
  decode, based at least in part on determining to decode the payload portion using the input sample timing that is different from the input sample timing used to decode the preamble portion, the payload portion using the input sample timing that is different from the input sample timing used to decode the preamble portion.

24. The non-transitory computer-readable medium of claim 17,
  wherein the msgA communication includes a plurality of copies of a payload that each are sent with a different TA, and
  wherein the payload portion that is decoded comprises a copy, of the plurality of copies of the payload, that is selected based on the network-entity-estimated TA.

25. An apparatus for wireless communication, comprising:
  means for receiving a msgA communication of a two-step random access channel (RACH) procedure;
  means for determining, based at least in part on a frequency at which a preamble portion of the msgA communication is transmitted and a difference between a time at which the preamble portion is transmitted and a time at which the preamble portion is received, a network-entity-estimated timing advance (TA) for a payload portion of the msgA communication; and
  means for decoding, prior to transmitting a random access response (RAR) communication, the payload portion based at least in part on the network-entity-estimated TA.

26. The apparatus of claim 25, wherein the means for decoding the payload portion comprises:
  means for determining, based at least in part on a quantity of available fast Fourier transform (FFT) engines associated with the apparatus, to decode the payload portion using an input sample timing that is different from an input sample timing used to decode the preamble portion; and
  means for decoding, based at least in part on determining to decode the payload portion using the input sample timing that is different from the input sample timing used to decode the preamble portion, the payload portion using the input sample timing that is different from the input sample timing used to decode the preamble portion.

27. The apparatus of claim 25,
  wherein the msgA communication includes a plurality of copies of a payload that each are sent with a different TA, and
  wherein the payload portion that is decoded comprises a copy, of the plurality of copies of the payload, that is selected based on the network-entity-estimated TA.

28. The apparatus of claim 25, further comprising:
  means for determining another estimated TA for the payload portion based at least in part on a TA applied to the preamble portion; and
  wherein the means for decoding the payload portion comprises:
    means for decoding the payload portion based at least in part on the other estimated TA.

29. The apparatus of claim 25, the means for decoding the payload portion based at least in part on the network-entity-estimated TA comprises:
  means for applying a TA correction to the payload portion when decoding the payload portion,
  wherein the TA correction is determined based at least in part on the network-entity-estimated TA.

30. The apparatus of claim 25, the means for decoding the payload portion comprises:
  means for decoding the payload portion using an input sample timing that is different from an input sample timing used to decode the preamble portion.

* * * * *